Feb. 23, 1954 J. S. PILCH 2,670,249
SEMIRIGID MOUNTING FOR TRACTORS
Filed Aug. 25, 1950 2 Sheets-Sheet 1

Inventor
JOHN S. PILCH
By Raymond A. Paquin
Attorney

Feb. 23, 1954
J. S. PILCH
2,670,249
SEMIRIGID MOUNTING FOR TRACTORS
Filed Aug. 25, 1950
2 Sheets-Sheet 2
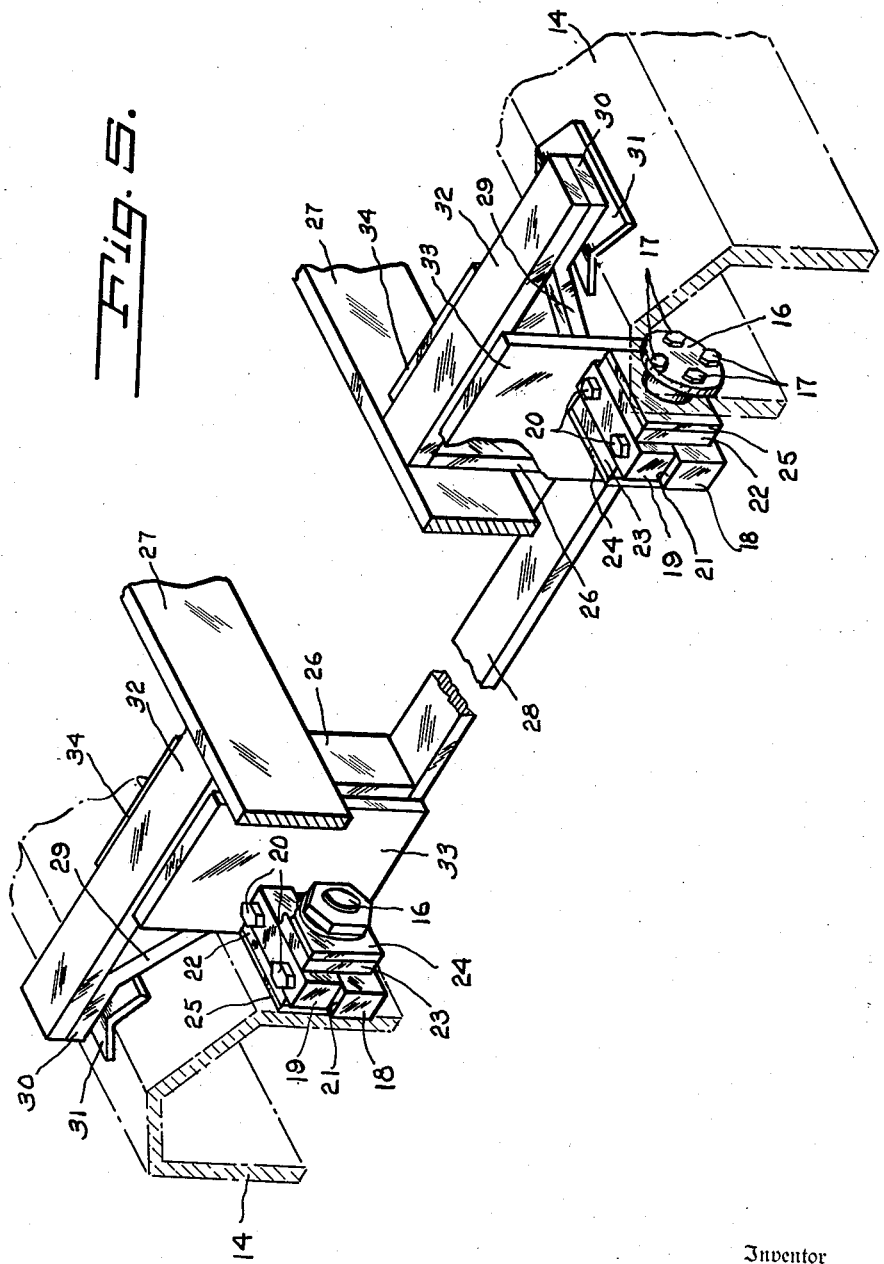
Inventor
JOHN S. PILCH
By
Raymond A. Paquin
Attorney Patented Feb. 23, 1954

2,670,249

UNITED STATES PATENT OFFICE 2,670,249

SEMIRIGID MOUNTING FOR TRACTORS

John S. Pilch, Ware, Mass.

Application August 25, 1950, Serial No. 181,487

8 Claims. (Cl. 305—8)

This invention relates to tractors and has particular reference to a semi-rigid mounting particularly adapted for track type tractors which allows limited oscillation of the tracks and controls side weave and up and down movement thereof while the tractor is passing over rough ground.

An object of the invention is to provide a mounting of the type set forth which is adaptable to tractors of existing types and which distributes the major portion of the motor and equipment weight on the center of the track frames.

Another object of the invention is to provide such a mounting which is especially valuable on tractors on which equipment will be built.

Another object of the invention is to provide such a mounting which may be adjusted to allow a controlled amount of side play or thrust.

Another object is to provide such a device which may be adapted to allow for variations in tractor width.

Another object is to provide such a device which tends to stabilize the tractor frame and also stabilizes the apparatus carrying part of the tractor.

Another object is to provide such a device which may be mounted on existing tractors without dismantling the tracks of the tractor.

Another object is to provide such a device which substantially eliminates distortion of the tractor frame or support.

Other objects and advantages of the invention will be apparent from the following description taken in connection with the accompanying drawings. It will be understood that changes may be made in the details of construction and arrangement of parts of the device shown, and described as the preferred form has been given by way of illustration only.

Referring to the drawings:

Fig. 5 is a perspective view of the construction shown in Fig. 2.

Figure 1:
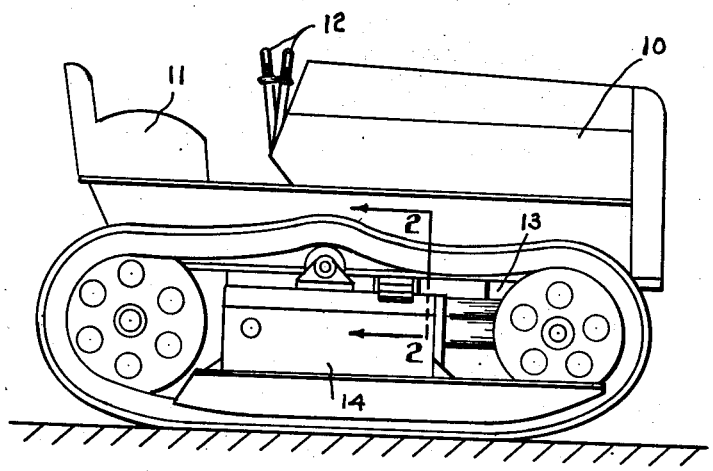
Fig. 1 is a side view of a tractor embodying the invention.
Figures 2, 4:
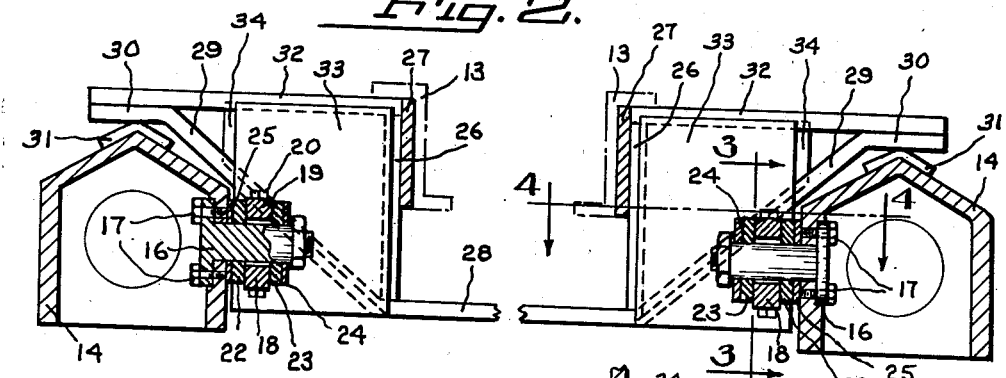
Fig. 2 is a fragmentary sectional view taken on line 2—2 of Fig. 1, looking in the direction of the arrows.
Fig. 4 is a sectional view taken on line 4—4 of Fig. 2, looking in the direction of the arrows.
Figure 3:
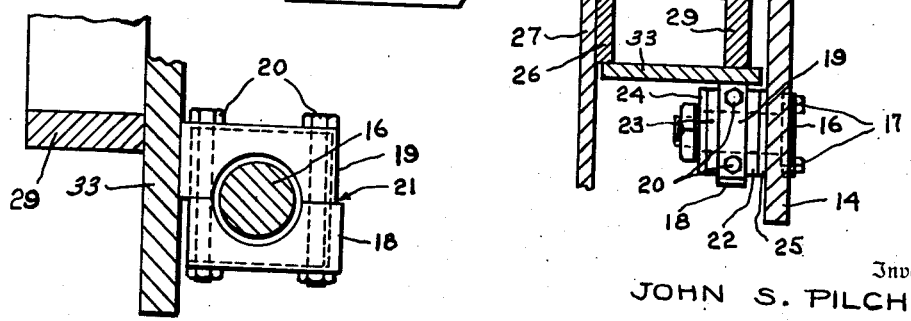
Fig. 3 is a sectional view taken on line 3—3 of Fig. 2, looking in the direction of the arrows.

Referring more particularly to the drawings in which similar reference characters designate corresponding parts throughout the several views, the tractor shown embodying the invention comprises the usual motor or engine 10, operator's seat 11, controls 12, frame including the Z bars 13, and track frames 14.

With prior tractors of the type set forth and particularly where apparatus such as a loader was mounted on the tractor, the weight of the tractor and the load of the apparatus depressed the tractor spring and when the tractor was driven over uneven ground there was a tendency to distort the upper portion of the tractor relative to the tractor and also to distort the apparatus.

If a rigid mounting were employed there would be a tendency of such mounting to break when the tractor is driven over uneven ground. I have found that by replacing the tractor spring with a semi-rigid mounting that this distortion and breakage can be eliminated.

This semi-rigid mounting is adapted to be carried by the tractor track frames 14 and be connected to the usual trunnions 16 which are each bolted to one of the track frames 14 by the bolts 17.

In order to allow the adaptation of the mounting of the invention to existing tractors without dismantling the tractor tracks there is provided a pair of split plates each having two sections 18 and 19 adapted to be secured together about one of the trunnions 16 by means of bolts 20 with plate section 18 having a lip 21 for facilitating the welding together of sections 18 and 19, if desired, for added stability.

On each of trunnions 16, and on opposite sides of the split plates are provided the steel thrust washers 22 and 23, which could instead be of hard rubber with limited thrust or resilience, and the shims 24 and 25 may be provided to compensate for variations in tractor width and allow the control of the amount of play or side thrust.

It will be noted that the hole or opening in each of the split plates is slightly larger than the diameter of the trunnions 16 while the opening through the thrust washers 22 and 23 and the shims 24 and 25 are such as to fit on trunnions 16. The size of opening is such as to provide a limited oscillation of tracks 14 while going over rough ground and thereby allows elimination or control of the side weave and control of the up and down movement of the track frames 14 while substantially eliminating distortion of the tractor frame or support.

The mounting is carried by the split plate sections 19 to each of which is secured, as by welding, the supports 26 to each of which is welded or otherwise secured the longitudinal members 27 which in turn are bolted or otherwise secured to the Z bars 13 of the tractor frame.

The supports or branch portions 26 are secured at their lower ends to a supporting frame member which has the central portion 28 extending beneath the crankcase of the tractor engine and the oppositely disposed angular portions or branches 29 offset from said central portion 28 and terminating in the deflected ends 30 adapted to rest upon and be supported by the plates 31 on the track frames 14 of the tractor.

The struts or branch portions 32, of which a pair are provided, are each secured to the upper portion of one of the branch portions or supports 26 by welding or other suitable manner and has its outer end secured to the upper surface of one of the deflected end portions 30.

The plate members 33 are each welded or otherwise secured to one of the angular portions or branches 29 of the supporting frame and also to strut or branch portion 32 and support or branch portion 26, thus forming a rigid frame and to further increase the strength of and stabilize this frame the gussets 34 are each secured to strut or branch portion 32, angular portion or branch 29 and support or branch portion 26 on the sides thereof opposite plate members 33, as by welding or other suitable process.

It will be seen that the mounting may be assembled and then mounted on the tractor by merely securing members 27 to the Z bars 13 and the sections 18 and 19 of the split plates around the trunnions 16.

From the foregoing it will be seen that I have provided simple, efficient and economical means for obtaining all of the objects and advantages of the invention.

Having described my invention, I claim:

1. In a track type engine propelled tractor, having a pair of track frames each having a trunnion on the inner side wall thereof, a mounting for allowing limited oscillation of the tracks and controlling side weave and up and down movement of said tracks while the tractor is passing over a rough surface, said mounting comprising a cross member having a portion extending under the tractor engine and end portions at each end of said cross member with each of said end portions having a pair of branches with one branch of each pair extending over each of the tractor track frames, means for securing one branch of said end portions to its respective trunnion, said means comprising a pair of split plate members, each of said plate members being secured to one of said trunnions, the other branch of said end portions each having a portion secured to the tractor frame and a portion extending over the tractor track frame.

2. In a track type engine propelled tractor, having a pair of track frames and a trunnion secured to each of said track frames on the inner side wall thereof, a mounting for allowing limited oscillation of the track frames and controlling side weave and up and down movement of said track frames while the tractor is passing over a rough surface, said mounting comprising a cross member having a connecting portion extending under the tractor engine, and end portions at each end of said cross member with each of said end portions having a pair of branches with one branch of each pair extending over each of the track frames, means for connecting each of said end portions to its respective track frame comprising a pair of connecting members with each of said connecting members being secured to one of said trunnions, the other branch of said end portions each having a portion secured to the tractor frame and a portion extending over the tractor track frame.

3. In a track type engine propelled tractor, having a pair of track frames each having a trunnion on the inner side wall thereof, a mounting for allowing limited oscillation of the tracks and controlling side weave and up and down movement of said tracks while the tractor is passing over a rough surface, said mounting comprising a cross member having a portion extending under the tractor engine and end portions at each end of said cross member with each of said end portions having a pair of branches with one branch of each pair extending over the tractor track frames, means for securing one of each of said pairs of end portions to each of said trunnions, said means comprising a pair of split plate members, each of said plate members being secured to one of said trunnions and a plate member on the upper side of each of said track frames, said last named plate members being positioned between said branches of said end portions and said track frames, the other branch of said end portions each having a portion secured to the tractor frame and a portion extending over the tractor track frame.

4. In a track type engine propelled tractor, having a pair of track frames and a trunnion secured to each of said track frames on the inner side wall thereof, a mounting for allowing limited oscillation of the track frames and controlling side weave and up and down movement of said track frames while the tractor is passing over a rough surface, said mounting comprising a cross member having a connecting portion extending under the tractor engine, and end portions at each end of said cross member with each of said end portions having a pair of branches with one branch of each pair extending over the track frames, means for connecting said end portions to trunnions on said track frames comprising a pair of connecting members with each of said connecting members being secured to one of said trunnions and a plate member on the upper side of each of said track frames, said plate members being positioned between said branches of said end portions and said track frames, the other branch of said end portions each having a portion secured to the tractor frame and a portion extending over the tractor track frame.

5. In a track type engine propelled tractor, having a pair of track frames and a trunnion secured to each of said track frames on the inner side wall thereof, a mounting for allowing limited oscillation of the track frames and controlling side weave and up and down movement of said track frames while the tractor is passing over a rough surface, said mounting comprising a cross member having a connecting portion extending under the tractor engine, and end portions at each end of said cross member with each of said end portions having a pair of branches with one branch of each pair extending over the track frames, means for connecting said end portions to said track frames with each of said end portions comprising a pair of connecting members with one of said connecting members being secured to one of said trunnions, each of said connecting members comprising a split plate having an opening for receiving one of said trunnions and means for securing said split plate about said trunnion, the other branch of said end portions each having a portion secured to the tractor frame and a portion extending over the tractor track frame.

6. In a track type engine propelled tractor, having a pair of track frames each having a trunnion on the inner side wall thereof, a mounting for allowing limited oscillation of the tracks and controlling side weave and up and down movement of said tracks while the tractor is passing over a rough surface, said mounting comprising a cross member having a portion extending under the tractor engine and end portions at each end of said cross member with each of said end portions having a pair of branches with one branch of each pair extending over each of said tractor track frames, means for securing said end portions to said tractor, said means comprising a pair of split plate members on each of said end portions, each of said plate members being secured to one of said trunnions and reinforcing means secured to each of said split plates, the other branch of said end portions each having a portion secured to the tractor frame and a portion extending over the tractor track frame.

7. In a track type engine propelled tractor, having a pair of track frames and a trunnion secured to each of said track frames on the inner side wall thereof, a mounting for allowing limited oscillation of the track frames and controlling side weave and up and down movement of said track frames while the tractor is passing over a rough surface, said mounting comprising a cross member having a connecting portion extending under the tractor engine, and end portions connected to said connecting portion and extending over the track frames, said end portions each having a pair of branches, means for connecting said branches to said track frames comprising connecting means for securing one of each of said pairs of branches to one of said trunnions, the other branch of said end portions each having a portion secured to the tractor frame and a portion extending over the tractor track frame.

8. In a track type engine propelled tractor, having a pair of track frames and a trunnion secured to each of said track frames on the inner side wall thereof, a mounting for allowing limited oscillation of the track frames and controlling side weave and up and down movement of said track frames while the tractor is passing over a rough surface, said mounting comprising a cross member having a connecting portion extending under the tractor engine, and end portions at each end of said cross member with each of said end portions having a pair of branches with one branch of each pair extending over the track frames, means for connecting said end portions to said trunnions on said track frames, the other branch of said end portions each having a portion secured to the tractor frame and a portion extending over the tractor track frame.

JOHN S. PILCH.

References Cited in the file of this patent

UNITED STATES PATENTS

| Number | Name | Date |
| --- | --- | --- |
| 1,413,148 | Wickersham | Apr. 18, 1922 |
| 2,135,820 | Kuchar | Nov. 8, 1938 |
| 2,223,802 | Heaslet | Dec. 3, 1940 |